United States Patent
Paige et al.

(10) Patent No.: US 7,199,857 B2
(45) Date of Patent: Apr. 3, 2007

(54) DIGITAL CONTROL UNIT FOR PROJECTOR AUTOMATION SYSTEMS

(75) Inventors: Robert F. Paige, Cedar City, UT (US); Thomas J. Schmidt, Bloomington, MN (US); Christopher H. Thieste, Plymouth, MN (US)

(73) Assignee: Regal CineMedia Corporation, Centennial, CO (US)

( * ) Notice: Subject to any disclaimer, the term of this patent is extended or adjusted under 35 U.S.C. 154(b) by 29 days.

(21) Appl. No.: 11/099,099

(22) Filed: Apr. 5, 2005

(65) Prior Publication Data

US 2006/0221302 A1   Oct. 5, 2006

(51) Int. Cl.
  *G03B 21/32* (2006.01)
  *G03B 21/50* (2006.01)
(52) U.S. Cl. .......................... 352/40; 352/92
(58) Field of Classification Search .............. 352/38, 352/40, 41, 92; 52/1
  See application file for complete search history.

(56) References Cited

U.S. PATENT DOCUMENTS

| | | | | | |
|---|---|---|---|---|---|
| 3,663,826 | A | * | 5/1972 | Schumann et al. | 307/39 |
| 3,684,358 | A | * | 8/1972 | Boudouris et al. | 352/25 |
| 5,026,152 | A | * | 6/1991 | Sharkey | 352/85 |
| 5,801,754 | A | * | 9/1998 | Ruybal et al. | 725/65 |
| 5,872,615 | A | * | 2/1999 | Harris, Jr. | 352/25 |
| 5,924,013 | A | * | 7/1999 | Guido et al. | 725/67 |
| 6,384,893 | B1 | * | 5/2002 | Mercs et al. | 352/133 |
| 6,483,568 | B1 | * | 11/2002 | Folio | 352/20 |
| 6,700,640 | B2 | * | 3/2004 | Morley et al. | 352/40 |
| 6,741,323 | B2 | * | 5/2004 | Plunkett | 352/90 |
| 6,812,994 | B2 | * | 11/2004 | Bubie et al. | 352/40 |
| 6,829,033 | B2 | * | 12/2004 | Hose et al. | 352/40 |
| 6,912,039 | B2 | * | 6/2005 | Patton et al. | 352/38 |
| 6,983,225 | B2 | * | 1/2006 | Sprogis et al. | 702/188 |
| 7,034,916 | B2 | * | 4/2006 | Bubie et al. | 352/40 |
| 2002/0122155 | A1 | * | 9/2002 | Morley et al. | 352/40 |
| 2003/0002689 | A1 | * | 1/2003 | Folio | 381/77 |
| 2004/0158865 | A1 | * | 8/2004 | Kubler et al. | 725/82 |
| 2004/0181819 | A1 | * | 9/2004 | Theiste et al. | 725/146 |
| 2004/0216163 | A1 | * | 10/2004 | Whitcomb | 725/74 |

(Continued)

OTHER PUBLICATIONS

Christie Top 5 Reasons: Five Reasons to Network Your Projector Using ChristieNET™ www.christiedigital.com.

(Continued)

*Primary Examiner*—Rodney Fuller
(74) *Attorney, Agent, or Firm*—Stuart T. Langley; Kent A. Lembke; Hogan & Hartson LLP (57) ABSTRACT

A projector automation system for controlling one or more controlled systems having functionality that is responsive at least in part to automation control signals. The automation system interacts with a digital projector having a control port and a film projector having a cue sensor that generates cue signals. A film-based cinema automation component receives the cue signals and generate at least some of the automation control signals to the one or more controlled systems. A second cinema automation component has a first interface coupled to the control port of the digital projector and the first cinema automation system. The second cinema automation component includes means for generating at least some of the automation control signals to the one or more controlled systems either autonomously, semi-autonomously, or in response to commands from an external scheduling system.

20 Claims, 4 Drawing Sheets

U.S. PATENT DOCUMENTS

2005/0055712 A1* 3/2005 Whyte et al. .................. 725/42
2005/0057724 A1* 3/2005 Patton et al. .................. 352/40
2005/0076372 A1* 4/2005 Moore et al. .................. 725/78
2005/0168694 A1* 8/2005 Peterson et al. ............ 352/133

OTHER PUBLICATIONS

CA21 Cinema Automation Configuration for Christie Inc, CAPIO Version, Apr. 11, 2002.

Typical Dual-Projector Installations using Christie Consoles, Christie Incorporated Asia.

Installation Notes for Dual Projector Changeover 2×CA21, (Coupled Mode), Christie Incorporated Asia.

CA21 Pennywise™ Cinema Automation Two Projector Coupling (Coupled Mode), Oct. 23, 1998.

CA21 Pennywise™ Cinema Automation Operating Manual, Jul. 8, 1997.

Christie Connectivity Module Projector Management & Control Solution, 2004.

International Search Report—PCT/US06/10190 (Sep. 19, 2006).

* cited by examiner

DIGITAL CONTROL UNIT FOR PROJECTOR AUTOMATION SYSTEMS

BACKGROUND OF THE INVENTION

1. Field of the Invention

The present invention relates, in general, to systems and methods for displaying movies, advertising, and alternative content, and, more particularly, to software, systems and methods for automating projection equipment.

2. Relevant Background

Film-based entertainment such as movies, live events combined with film features, and the like remain an important vehicle for entertainment and education throughout the world. The theatre environment is created by interaction of lighting, sound, picture quality, screen and curtain operation, and other factors. Demanding patrons appreciate coordination of these various factors so that their experience in the theatre is interesting, pleasant, and effective. A typical theatre comprises one or more auditoriums where each auditorium includes a projection, sound, and auditorium devices that control various activities during a presentation. A projection room or booth houses projectors, sound equipment, controllers, and the like used to control auditorium lighting, sound, and other functions involved in presenting film-based content to an audience. Traditionally, the projection booth is staffed by a projectionist who is responsible for loading film reels onto the projector, adjusting the optical and audio properties within the auditorium, and turning the projectors on and off at appropriate times.

Manual performance of projectionist functions has some advantages in that certain activities such as adjusting sound and light levels benefit from the presence of a skilled projectionist. However, other functions such as turning projectors on and off or synchronizing the projection with other events in the auditorium may be improved by automation. As events become more complex and involve more complex synchronization of activities, the need for automation within the projection booth has increased. Moreover, automations allow a single projectionist to staff multiple auditoriums, thereby reducing cost of presenting an event.

Theatre automation systems, also called cinema automation systems, have developed to automatically or semi-automatically perform several theatre functions in synchronization with a film being presented. A film or sound track is encoded with optical or magnetic markers called "cues" that are detected by the theatre automation system. Cues may be attached in-between programming, or within a particular feature or trailer. The theatre automation system may then respond to a detected cue by manipulating theatre lights, sound, raising/lowering a curtain, or other activities that affect the theatre environment. There are many theatre automation systems available and no uniform way in which theatre automation systems operate. In other words, a cue signal will cause different theatre automation systems to behave differently.

Because conventional theatre automation systems receive their cues from a sensor within a film projector, the systems are most useful in theatres using film-based entertainment. However, theatre owners are continually attempting to increase the variety of types of material that can be presented in a theatre. For example, digital projectors provide a new method to present high-quality, engaging and dynamic content to theatre patrons. Digitally presented content is increasingly used to present advertisements and public service announcements, but can also be used to present live events and/or pre-recorded events to an audience in a theatre.

Most digital projection equipment is amenable to automation using programmable computers. Digital projectors may be equipped with standard serial communication ports and have electronics that respond to signals on the serial port to perform functions such as turning the projector on, adjust focus, adjust brightness and the like. More recently, digital projectors include various instrumentation that can be monitored via the serial connection so that information about lamp life, air filter condition, and other status information about a projector can be gathered.

To enable more efficient remote control of theatre equipment, the functionality provided by the theatre automation equipment and/or digital projector must be conveyed over a data communication network to central locations. In the case of digital projectors various manufacturers have provided connectivity modules that couple to the serial projector ports and provide a network-compatible interface such as an Ethernet connection. The connectivity modules provide the hardware and circuitry necessary to connect to a network as well as send and receive packet communications over the network. The connectivity modules translate commands received from a central controller into appropriate signals on the serial projector interface. One example of such a device is ChristieNET™ Connectivity Module (CCM) provided by Christie Digital Systems.

Connectivity modules, however, have not been developed to interface closely with film projectors or film-based theatre automation equipment. This is, in part, because film-based equipment is often built using older technology that is more difficult to interface with as compared to digital projection equipment. Because film-based projection equipment may be viewed as outmoded, connectivity module manufacturers have less incentive to support these markets. However, the large installed base of film-based theatres as well as the large quantity and variety of film-based entertainment is believed to ensure that film-based theatres have a significant lifespan. This lifespan can be further extended and enriched by providing improved automation capabilities for film-based theatres as well as automation capabilities that integrate more fully with digital projection equipment.

U.S. patent applicaiton Ser. No. 10/458,589 entitled "DIGITAL PROJECTOR AUTOMATION" which is incorporated by reference herein in its entirety describes an integrated projector automation system in which a soft shutdown mechanism for a digital projector is triggered by monitoring the state of a conventional switched power outlet. This allowed a soft shutdown process for digital projectors rather than the abrupt shut off normally provided by the switched outlet. This invention, which is owned by the assignee of the present invention, provided some level of coordinated control and management of both a film projector and a digital projector by implementing one-way communication between a film projector automation system and a computer system used to implement advanced theatre automation and management, as well as integration with a digital projector. However, it is desirable to provide a richer set of control functionality that is provided by the above-identified patent application.

SUMMARY OF THE INVENTION

Briefly stated, the present invention involves a projector automation system for controlling one or more controlled systems having functionality that is responsive at least in part to automation control signals. The automation system interacts with a digital projector having a control port and a film projector having a cue sensor that generates cue signals.

A film-based cinema automation component receives the cue signals and generate at least some of the automation control signals to the one or more controlled systems. A second cinema automation component has a first interface coupled to the control port of the digital projector and the first cinema automation system. The second cinema automation component includes means for generating at least some of the automation control signals to the one or more controlled systems either autonomously, semi-autonomously, or in response to commands from an external scheduling system.

DETAILED DESCRIPTION OF THE PREFERRED EMBODIMENTS

The present invention is illustrated and described in terms of a device that integrates with existing theatre automation equipment and can perform as either an intelligent relay by implementing commands received from centralized control mechanism, or as a primary controller that stores and executes commands on its own. When acting as an intelligent relay, commands are received from an external scheduling device and the present invention implements the received commands by driving appropriate signals to one or more controlled devices. When acting as a primary controller, the present invention can respond to on/off or start/stop commands from the centralized control mechanism, but will otherwise execute stored commands to implement a schedule of auditorium activities (e.g., lights on/off, adjust audio, and the like) itself. In this manner the present invention enables the control of systems within an auditorium to be divided and distributed between digital control unit 109 and client 115 in any manner that is desirable for a particular application.

The present invention is illustrated and described in terms of a managed theatre environment such as might be implemented by a national chain of theatres or an organization of cooperating independent theatre owners. However, the present invention is readily scaled to provide both international and local services, and may be implemented in a single venue or a home theatre environment. It should be understood that while the exemplary implementations involve controlling projection equipment to coordinate the presentation of material using both film-based and digital projection equipment, the present invention is broadly applicable to a variety of control tasks that may be required in a theatre or similar venue.

Figure 1:
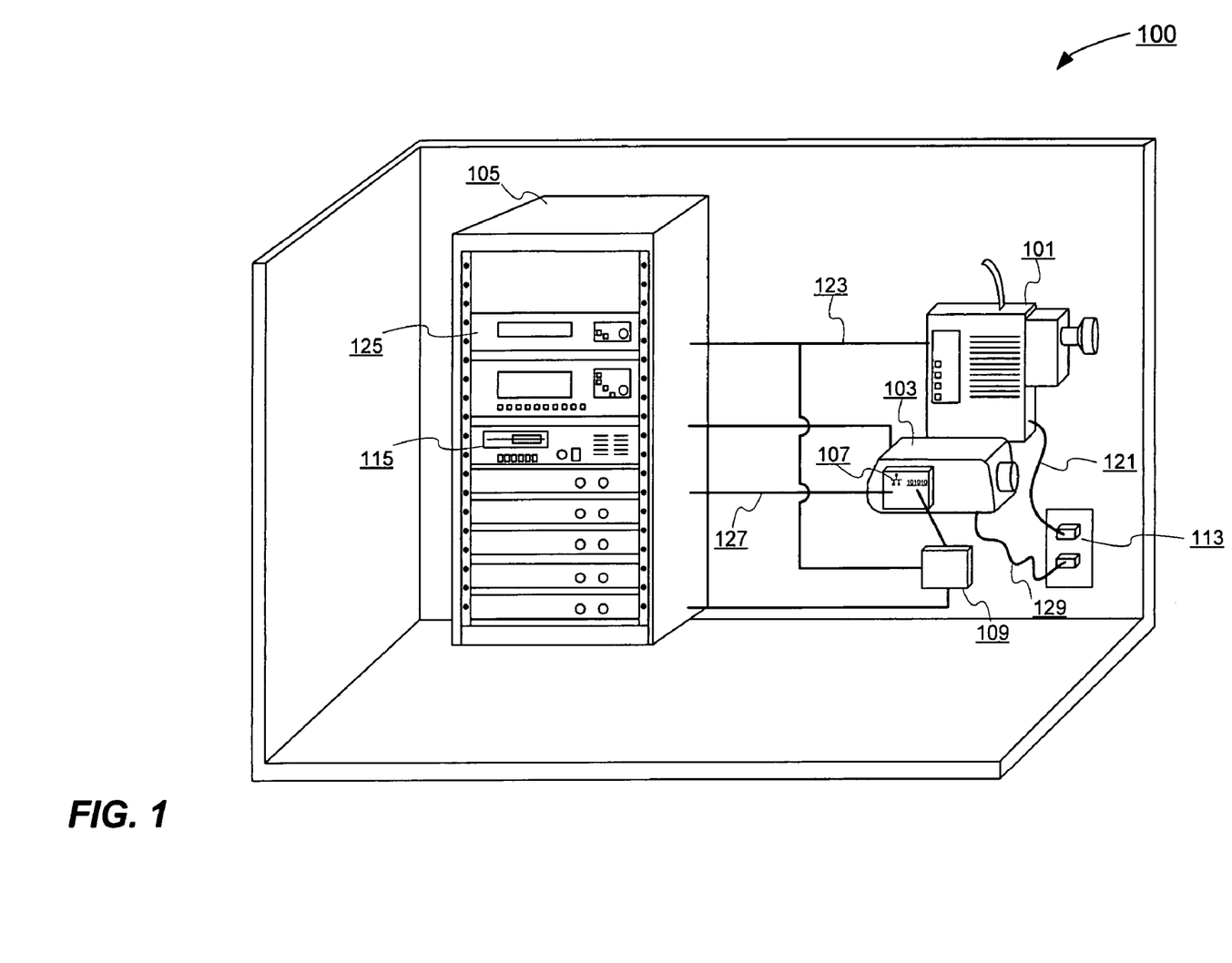
FIG. 1 shows an exemplary projection booth implemented in accordance with the present invention.

FIG. 1 shows an embodiment of a projection room 100 that provides projection equipment for an auditorium within a theatre. A multiple auditorium facility may include several projection rooms 100, or a single projection room that includes equipment for multiple auditoriums. In accordance with the present invention, projection room 100 includes both legacy film-based projection equipment such as projector 101, as well as digital projection equipment such as digital projector 103. In addition, projection room 100 may include a slide projector (not shown), or other presentation devices.

Equipment rack 105 houses a variety of audio processing/amplification devices and automation devices as well as auditorium client 115. Auditorium client 115 is implemented by processes executing on a programmable computer, for example. Although prior systems contemplated using client 115 to control a digital projector 103, in accordance with the present invention client 115 is able to control a great variety of additional processes. Auditorium client 115 may be responsible for one or more auditoriums and serves as an engine for controlling various controllable features of the theatre environment such as lighting, projector activity, switching between projectors, selection of sound sources, selection of digital content, operating theater curtains and the like.

Theatre automation equipment 125 traditionally used to automate projector 101 may also be included. For example, projector control devices such as cue detectors, which are mounted to and integrated with the projector 101, generate signals corresponding to cues placed on the film itself. Automation equipment 125 may be implemented by devices such as CA21, CA100, and Christie 3Q automation equipment, available from Christie Digital Systems, Inc., receives these signals and can be programmed to perform desired functions in response to receiving film cue signals. Projector 101 may produce various industry standard cue signals over line 123 that are also coupled to the automation equipment 125 to perform such functions as raising/lowering curtains, adjusting auditorium lighting, and adjusting operation of an audio system.

Digital projector 103 is coupled to auditorium client 115 to receive video signals using any available video signal encoding and transmission technology. Digital projectors commonly implement ports for RGBHV and component (Y, Pb, Pr) video signals. Other signaling include, without limitation, S-Video, digital video interface (DVI), high definition media interface (HMDI), as well as formats frequently used in computer systems such as, RGB, Video Graphics Array (VGA), Super-VGA (SVGA), Super Extended Graphics Array (SXGA), Ultra Extended Graphics Array (UXGA). In some cases digital projector 103 may include tuning components that allow digital projector to receive broadcast/cable signal formats such as NTSC (National Television Standards Committee), Phase Alternation Line (PAL), Sequential Couleur avec Memoire (SECAM), as well as other formats that may be available or developed as standards or for particular applications.

Client 115 typically sends audio information to the audio processing equipment within equipment rack 105. The audio information may be monaural, stereo, or multi-channel audio such as such as 5.1 (six channel) and 6.1 (seven channel) and 7.1 (eight channel) that are becoming increasingly popular in commercial as well as home theatre environments. In many cases the audio information may use a proprietary format communicate the enhanced information such as Dolby Digital, Dolby Pro Logic II, Dolby Digital EX, THX EX and Dolby SR formats defined by Dolby Laboratories, Inc. and/or DTS, DTS Neo:6, DTS ES, and DTS 96/24 formats defined by Digital Theatre Systems, as well as other formats that are or may become available.

In many installations, digital projector 103 replaces a slide projector (not shown) to provide more dynamic content than possible with a slide projector. Digital projector 103 typically implements a remote control interface (not shown) which is designed to allow control of digital projector 103 by sending properly formatted signals rather than by manually operating button and controls on the projector 103 itself. More recently, a variety of control modules such as interface adapters 107 are available that couple to the remote control interface of projector 103 to enable more flexible communication and network connectivity to the projector 103. An example interface adapter 107 is the ChristeNET™ Connectivity Module (CCM) product available from Christie Digital Systems, Inc. This particular device implements various services such as a web server to enable web-based management, SNMP client for net management type notifications, Telnet services to enable Telnet-based management, timers, and the like.

Interface adapter 107 implements a network interface for coupling to a local area network (LAN) such as theatre LAN over line 127. Interface adapter 107 also implements a serial port configured to control external equipment via the network, essentially taking network commands received over the LAN port and converting them to serial format signals compatible with the external device (not shown) to be controlled. Significantly, legacy film based projection equipment 101 uses a different and independent command communication system (e.g., automation equipment 125) than the network control implemented by digital projector 103.

The present invention comprises a digital control unit 109 that implements a two-way interface between the film projector automation system 125 and the client 115. The digital control unit 109 can detect signals from the client 115 and/or receive commands to turn the digital projector 103 on and off as well as control various activities such as the masking and lighting in the auditorium via the projector automation system 125. Digital control unit 109 includes one or more sensors for sensing the state of various equipment in the projection room 100 in combination with a relay board for driving various subsystems such as lighting, screen controls, auxiliary projectors, and the like. The digital control unit 109 includes data processing resources capable of implementing programmed processes that describe a particular automation routine, for example, receive signals from sensors, and generate relay control signals. The digital control unit 109 includes ports for coupling to interface adapter 107, client 115 and film projector automation device 125, for example. This rich connectivity enables the digital control unit 109 in accordance with the present invention to provide greatly expanded coordination of events amongst various automated devices in the theatre environment.

Auditorium client 115 is responsive to schedule information that is previously stored and/or downloaded from external sources to generate control signals to digital control unit 109. These control signals indicate, for example, when digital content items are scheduled to play, when to make curtain changes, adjust auditorium lighting, and the like. Alternatively, some of these schedule items can be implemented by digital control unit 109 autonomously or semi-autonomously.

Digital control unit 109 may also implement various sensor inputs to monitor state information describing the operational and/or maintenance state of various devices and subsystems such as a fail safe sensor, automation remote start sensor, auditorium/theatre fire alarm sensor, change-over close (dowser state) sensor, change-over open sensor, film motor running status sensor, and the like. The state information can be used to generate one or more notifications to a projectionist or to an automated projection system. The notification can be used by the projectionist or automated projection system to warm up the projector, start the projector or perform other theatre operations such as adjusting lighting, sound, curtains, screen level, and the like.

These sensors not only provide useful feedback for the operation of the digital projector 103 and client 115, but also provide audit trail data that can be used by theatre management systems. This state information can be stored for later analysis and use, and/or forwarded to client 115 and/or centralized theatre management systems. The audit trail data indicates the operational state of a theatre at a fine level of detail that allows centralized analysis and reporting of individual auditorium subsystems. This information can be used, for example, for troubleshooting, maintenance, preventative maintenance, and improved customer service.

Figure 2:
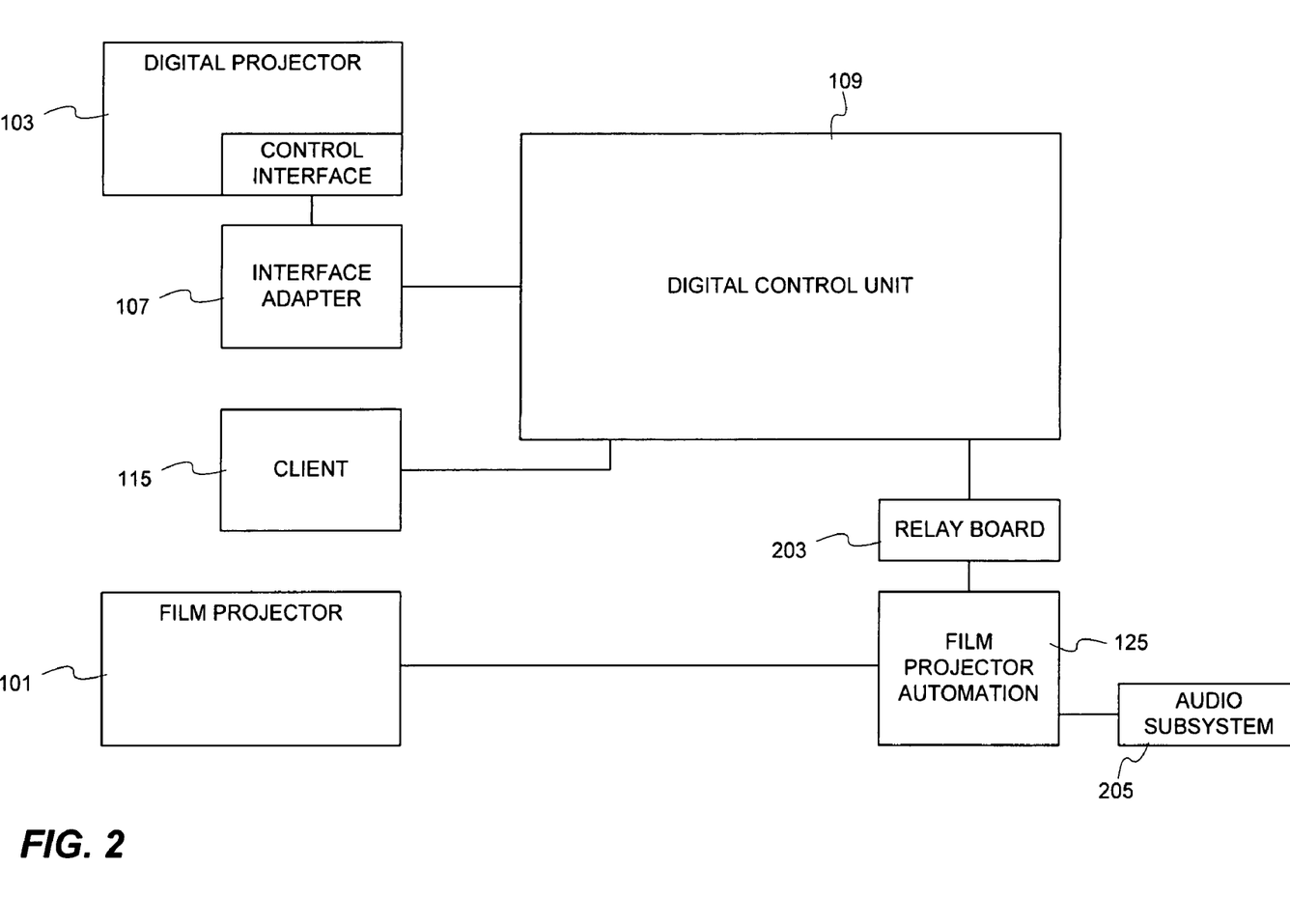
FIG. 2 shows a functional block diagram of an automation system including a control module interface in accordance with an implementation of the present invention.

FIG. 2 shows a functional block diagram of an automation system including a control module interface in accordance with an implementation of the present invention. In the example of FIG. 2, digital control unit 109 implements a central connectivity system that couples to the various controlled systems that affect the theatre environment. In the case of devices that have standard electrical interfaces such as serial ports that can be connected by DB9/RS232/RS485/USB connectors and cables, digital control unit 109 provides a compatible physical port with appropriate driver circuits for sending and receiving compatible information to the connected devices. In many cases interface adapter 107 will support one or more physical/electrical interface standards, as will client 115 when implemented as a programmable computer, workstation or the like. While the specific examples provided herein designate specific electrical connection standards, the present invention is not limited to any particular interface or data type.

Digital control unit 109 may be configured with additional ports to connect to screen/curtain motors, auditorium light controllers/monitors, auditorium audio system controllers/monitors, closed captioning devices and the like, Digital control unit 109 may also provide special purpose physical and electrical ports for connecting to devices such as film automation system 125 that lack adequate connectivity. In the case of film projector automation system 125, digital control unit 109 couples to a relay board 203 that, in turn, supports various connections to film projector automation system 125 and/or other systems such as audio subsystem 205. Relay board 203 may implement programmable or hardwired logic to combine signals from film projector automation system 125 based on film-cues with signals generated by digital control unit 109. Relay board 203 may also include sensor systems to generate sensor signals based on the current state or change of state in any monitored system. The sensor signals can be coupled to digital control unit 109 for further action.

Figure 3:
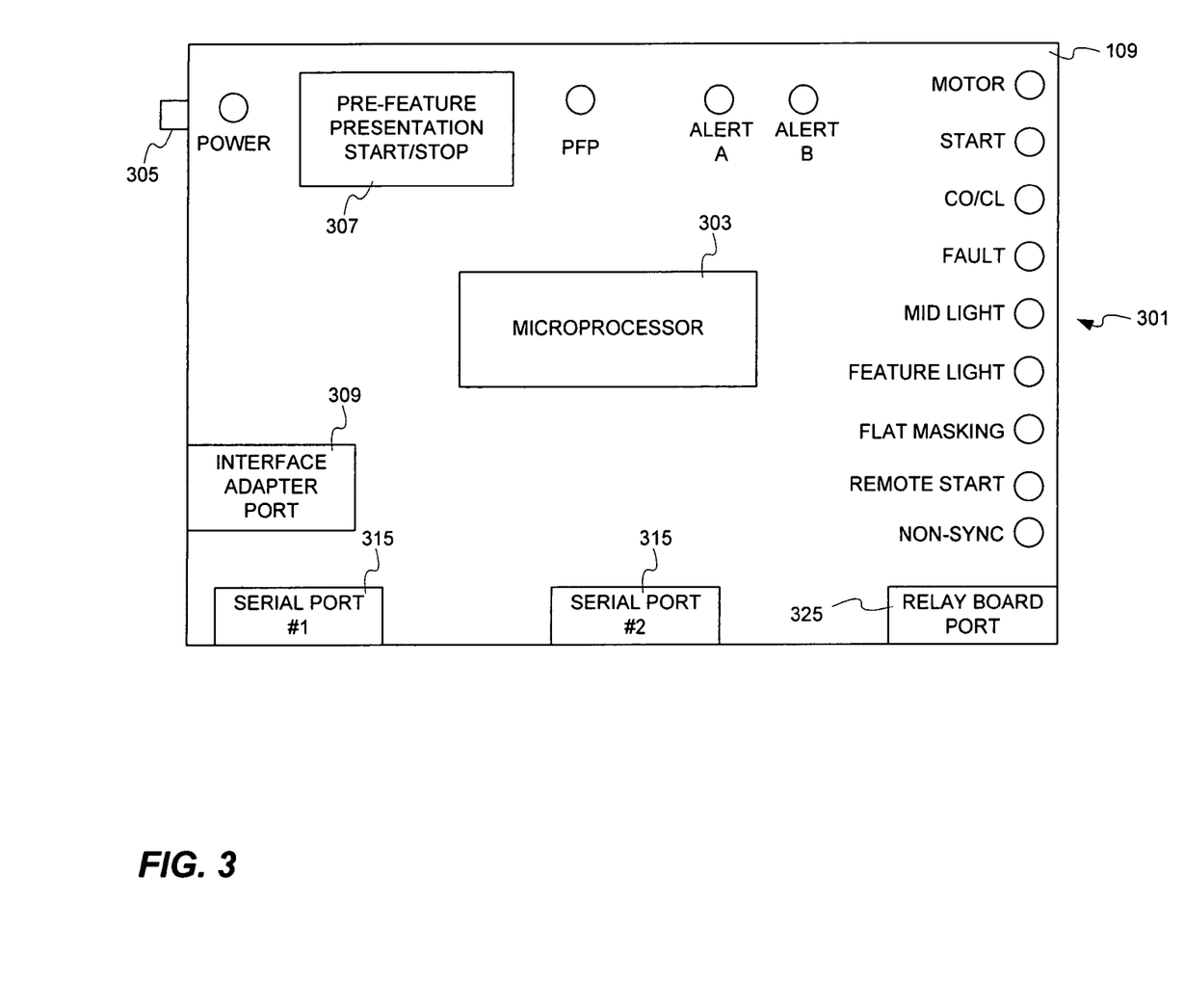
FIG. 3 shows a digital control unit of FIG. 2 in greater detail.

FIG. 3 illustrates components of an exemplary digital control unit 109 in greater detail. In the particular implementation digital control unit 109 is implemented as a board having a microprocessor or microcontroller 303 having a data processing capacity sufficient to implement programmed instructions. Processor 303 may have integrated memory or external memory (not shown) provided for use by digital control unit 109. A number of indicator lights 301 may be implemented in digital control unit 109 to provide visual indicators for the state of automated devices within the theatre environment. In many cases it is only the on/off or active/inactive state that is of interest in which case indicator lights such as light emitting diodes provide a convenient mechanism for communicating information to a projectionist. In other cases it may be valuable to implement a text or graphic display to indicate more complex information.

Microprocessor 303 is interconnected to a rich variety of input/output ports provided with digital control unit 109. Interface adapter port 309 is designed to connect to interface adapter 107 and/or projector 103. Interface adapter port 309 comprises a serial physical interface such as a DB9M-M connector and appropriate line driver/receiver circuitry. In a particular implementation a Y-cable is constructed with a DB9M-F connector to couple to interface adapter port 309, a DB25M connector to couple to interface adapter 107, and a DB9F connector to couple to projector 103. Other cable configurations are contemplated to meet the connectivity requirements of a particular application.

Serial ports 315 implement standard interfaces such as RS-232 interfaces supported by 9-pin or 25-bin connectors and cables in the particular implementation of FIG. 3. The standard serial port configuration allows connection to other devices such as personal computers having a compatible serial interface. Other subsystems such as audio subsystem 205 (shown in FIG. 2) may be controlled indirectly by digital control unit 109 through relay board 321 via relay board port 325.

The specific implementation shown in FIG. 3 includes several indicators implemented by light emitting diodes to visually indicate various conditions as well as buttons to control certain activities. The operation of these controls and indicators is summarized in Table 1.

TABLE 1

| | |
|---|---|
| Power | LED indicates that the DCU has power from the wall AC/DC power supply. This LED is lights solid constantly while power is being supplied to the digital control unit 109. |
| PFP button | Is pressed and released to start or stop the pre-feature presentation. If the pre-feature presentation is playing pressing the button will stop the pre-feature presentation and if the pre-feature presentation is not playing pressing the button will start the pre-feature presentation. The PFP/Intermission LED will flash acknowledging that the PFP button has been pressed. It will take approximately one minute from pressing the button before the pre-feature presentation is visible and audible when stating the pre-feature presentation. |
| PFP/Intermission LED | Flashes when the PFP button has been pressed. LED is on solid when the film projector is not running indicating the movie intermission or the time between the movie show times. This LED along with the Motor Run LED serve as indicators that the digital control unit 109 microprocessor is working properly. |
| Alert A LED | Indicates that the pre-feature presentation is about to end with a flashing or constant green light. |
| Alert B LED | Indicates that the pre-feature presentation is about to end with a flashing or constant red light. |
| Motor Run | Indicates that the film projector motor is running and stays lit solid as long as the motor runs. Along with the Start LED being active the digital control unit 109 tells the client 115 and DCN projector that the movie is playing. This LED along with the PFP/Intermission LED indicates that the digital control unit 109 microprocessor is working properly. |
| Start LED | Flashes when the projector automation start button is pressed or the Change over Open (CO/O) (i.e., dowser open) on the film projector has occurred. This signals that the movie is really running and the film projector motor is not just being "bumped". This LED stays lit during the entire movie. This LED goes from flashing to solid when the CO/C timer has expired (e.g., 30 minutes into the movie). |
| CO/C LED | Lights solid when the movie is finished and the dowser has closed (CO/C) and Change over Closed (i.e., dowser closed) has occurred indicating that the movie is ending properly. This LED stays lit until the film projector motor stops. A CO/C timer starts when the motor and CO/C are active. No CO/C signals are recognized until this timer has expired to allow for CO operation between the trailers and the actual movie presentation. |
| Fault LED | Indicates that either the film has broken or another film projector malfunction has occurred. Either the CO/C or the film projector fail safe sensors can trigger this LED to light constantly. A message is sent to client 115 and the LED will go off after a timeout period before the next pre-feature presentation and movie start. |
| Fire Alarm LED | Lights constantly when the theatre fire alarm is active and the digital control unit 109 signals the client 115 and the projector 103 to stop player and turn off the projector lamps. This LED turns off and stops signaling client 115 and projector 103 when the fire alarm goes to an inactive or off state. |
| Mid Lights LED | Lights solid briefly and then turn off when the digital control unit 109 is commanded by the client 115 to pulse the auditorium lighting to the "Mid" lighting level. |
| Feature Lights LED | Lights solid briefly and then turn off when the digital control unit 109 is commanded by the client 115 to pulse the auditorium lighting to the "Feature" level lighting. |
| Flat Masking LED | Lights solid briefly and then turn off when the digital control unit 109 is commanded by the client 115 to pulse the auditorium masking to flat. This LED will also light at the end of a movie due to an automatic command in the digital control unit 109 to pulse to flat masking. |
| Remote Start | Lights solid briefly and then turn off when the digital control unit 109 |

TABLE 1-continued

| | |
|---|---|
| LED | is commanded by the client 115 to pulse the projector automation remote start function which will start the film projector. |
| Non-Sync 1 LED | Lights solid briefly and then turn off when the digital control unit 109 is commanded by the client 115 to pulse the Cinema Audio Processor to the Non-Sync 1 audio input. This LED will also light at the end of a movie from an automatic digital control unit 109 command to set the audio to non-sync 1 for music player and the pre-feature presentation during the intermission time period. |

Digital control unit 109 implements a communication protocol for communicating control signals and/or monitoring signals with devices such as client 115. Any available protocol may be implemented to implement communication and messaging between the devices. In a specific implementation one of the ports 315 is coupled to client 115 and receives 9600 bps 8-1-N protocol ASCII commands for configuring and commanding digital control unit 109. It should be understood that any of the specific ports can be used to communicate configuration and command information, and the selection of a particular serial port 315 is provided only to illustrate a specific implementation. Moreover, a special-purpose serial port, parallel port, network port, or the like may be provided to support communication of configuration and command information with digital control unit 109.

In a particular implementation the command protocol uses three ASCII characters to indicate an action followed by a set of ASCII characters that specify an object upon which the action is to take place. The object specification is followed by a delimiter such as a comma or underscore which is followed by a character string indicating a parameter (e.g., "on", "off", and the like). The command is terminated by a special character such as a bracket ("]"), or pound character ("#"). Line feeds and carriage returns may be added to improve readability and manual command entry. Examples of the particular protocol are shown in TABLE 2.

TABLE 2

| COMMAND STRING | DESCRIPTION |
|---|---|
| strgeenlight# | Status request from client 115 to digital control unit 109 to determine the status (indicated by "str") of the object "greenlight". |
| stagreenlight,onf#<cr> | Status response sent from digital control unit 109 to client 115 indicating that the status (indicated by "sta") of the green light is on. |
| cmdlighting.mid# | Command from client 115 to digital control unit 109 to set the lighting to a level defined as "mid". |
| stalighting.mid#<cr> | Command response sent from digital control unit 109 to client 115 indicating that the lighting is set to a level defined as "mid". |

A basic set of commands includes status requests using a mnemonic "str", status response using the mnemonic "sta", and control commands indicated by the mnemonic "cmd". As the serial interfaces 315 are used largely for passing signal and status information between components high speed serial interfaces such as USB and Firewire are not required. However, such ports can be implemented if the cost and performance are justified for a particular application.

In operation, manual start stop button 307 is used by a projectionist to begin a pre-feature presentation in the particular embodiment. Activation of button 307 initiates execution of a set of programmed instructions using microprocessor 303. For every command received from client 115, digital control unit 109 will generate a response on the port 315 that is connected to client 115. The command protocol implemented between digital control unit 109 and client 115 preferably supports inquiries such that client 115 can retrieve status information from digital control unit 109 as desired.

In a movie theatre event, for example, projector 103 will receive pre-show content to display pre-show features for several minutes before a film presentation. Digital control unit 109 monitors pre-feature presentation start/stop button 307 to determine when the button is pressed. When the start/stop button 307 is pressed digital control unit 109 sends an indication to client 115 via serial port 315. In response, client 115 begins sending content to digital projector 103.

Auditorium lights may be dimmed by sending an appropriate control signal from client 115 to digital control unit 109. In turn, a relay control signal is passed to relay board 321 that will affect dimming the auditorium lights. A particular implementation of relay board 321 is shown in greater detail in FIG. 4. Relay board 321 includes optically isolated sensor inputs for connection to various subsystem sensors such as a projector motor running sensor, start sensor, digital projector sensor, change/over close sensor, CO/O sensor, fail safe sensor and fire alarm sensor. In this manner the status of these various automatically controlled subsystems can be determined.

Figure 4:
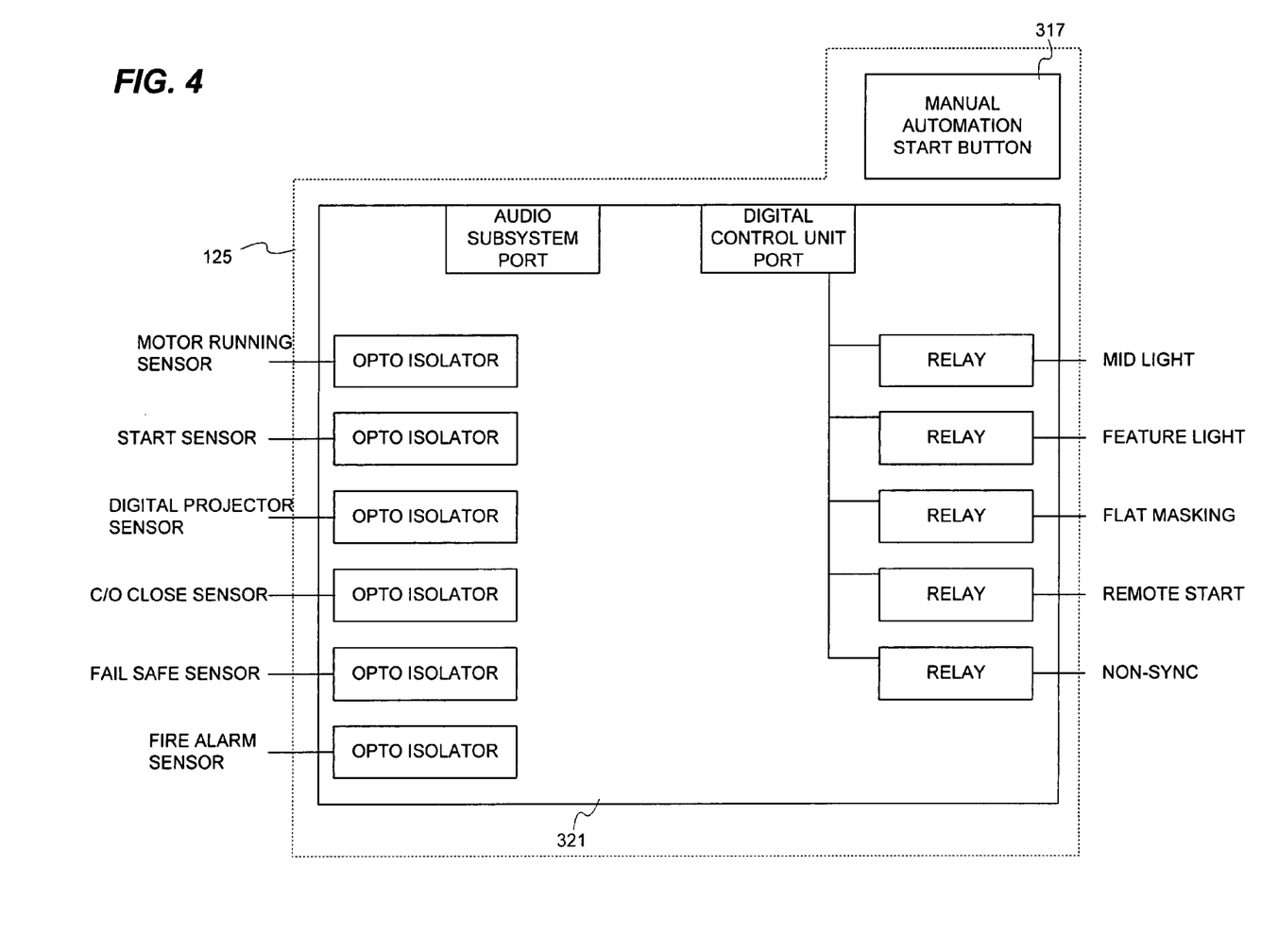
FIG. 4 shows a projector automation system of FIG. 2 in greater detail.

Relay board 321 also includes various relays that are normally under the control of the film-based projector automation system 125 and respond to cues encoded on the film (e.g., by foil or bar codes). Relay board 321 is coupled to digital control unit 109 to enable control of these relays by digital control unit 109 in addition to or instead of the control provided by film projector automation system 125. Manual reset button 305 can be activated to reboot the digital control unit 109 and restore the processor 301 and other components of digital control unit 109 to a known state.

Examples of signaling implemented in a particular situation include an application in which the digital projector 103 is to stop playing in response to the start of a film feature on projector 101. The projector 101 is started by a projectionist manually activating the projector automation manual start button 317, for example. The occurrence of a film being presented by projector 101 is indicated when the motor of film projector 101 is running and the projector automation manual start button 317 is activated. Optically isolated sensors in relay board 317 detect both of these conditions and send appropriate signals to digital control unit 109 via relay board port 325.

In the particular example, digital control unit 109 normally holds a high voltage on one pin of the interface adapter port 309 to indicate that the film projector 101 is not presenting. Upon receipt of both the motor running signal and the manual start signal, digital control unit 109 places a low voltage on the designated pin of port 309. Interface adapter 107 and/or digital projector 103 respond to the indication that film projector 101 is running by, for example, initiating a shut down of digital projector 103 and/or preventing the lamps in digital projector 103 from being turned on so that only one presentation is showing at a time.

In the event that the projector 101 motor stops running and the fail safe drops before the CO/C timer expires, a film break has occurred and a fault indicator on digital control unit 109 is activated. The fault indicator is kept active until the motor of projector 101 is started again. In a particular implementation an error signal is sent to client 115 via port 315 indicating a film break has occurred and a hive voltage signal is driven onto the appropriate pin of interface adapter port 309 to indicate that the film projector is not running. Client 115 is then able to take a programmed remedial action such as generating a notification, logging the event, and the like.

In particular implementations digital control unit 109 supports connections to the auditorium/theatre fire alarm system via a relay on relay board 321. Many projector automation systems 125 include interfaces to auditorium/theatre fire alarm systems, however, they do not port the status of this interface to external systems. The present invention enables the information to be monitored and conveyed to digital control unit 109, which is able to generate a message to client 115. Digital control unit 109 also places a signal on the appropriate pin of interface adapter port 309 while the fire alarm is active to indicate that the projector 101 is on, irrespective of the actual operating state of projector 101. This enables the interface adapter 107 to prevent the digital projector 103 from turning on, which could confuse patrons in an actual emergency. When the fire alarm is deactivated a control message is sent to client 115 indicating that the fire alarm is off and the appropriate pin of interface adapter port 309 is placed in a state that indicates the actual status of film projector 101.

In the event that a CO/C cue is not received before the film projector 101 motor stops after a start button activation is received, a fault indicator on digital control unit 109 is activated and an error message is sent via serial port 315 to client 115. This fault will clear itself (i.e., expire automatically) after a predetermined time such as 120 seconds after the motor of projector 101 has stopped. When the motor has stopped the appropriate pin of interface adapter port 309 returns to a state indicating that the projector 101 has stopped. Interface adapter 107 can use this information to activate digital projector 103 to provide alternative content during the error event.

Digital control unit 109 can also be programmed to maintain a history or log of pre-show features and films that are presented, as well as any fault conditions that occurred during the presentation. This history can be useful for equipment maintenance as well as verification that certain content was presented and when it was presented. The history information can be maintained over a period of time and/or transmitted to client 115 periodically or at the end of a particular event.

The above-described operation of digital control unit 109 can be thought of as an emulation of a cinema automation system that has historically been available for film-based projection equipment. Although digital control unit 109 produces similar functionality to a cinema automation system 125, it also integrates with and expands the utility of the conventional automation system 125. Hence, theatres with installed cinema automation systems 125 can continue to use those systems thereby leveraging their investment in capital and training associated with cinema automation systems 125.

The digital control unit 109 can operate as either an intelligent relay by implementing commands received from client 115, or as a primary controller that stores and executes commands on its own somewhat independently from client 115. When acting as an intelligent relay client 115 sends control commands over serial port 315 and digital control unit 109 implements the command by driving appropriate signals to controlled devices. When acting as a primary controller, digital control unit 109 can respond to on/off or start/stop commands from client 115, but will otherwise execute stored commands to implement a schedule of auditorium activities (e.g., lights on/off adjust audio, and the like) itself. In this second mode of operation it is contemplated that the client 115 will remain in control of the start/stop functions so that the auditorium activities remain synchronized with the schedules maintained by client 115. Also, it is contemplated that client 115 is able to query status information from digital control unit 109 so that it can determine the current state of the controlled auditorium systems. It may also be beneficial to allow client 115 the ability to set and reset indicator lights on digital control unit 109 so as to improve coordination between client 115 and digital control unit 109. In this manner the control of systems within an auditorium can be divided and distributed between digital control unit 109 and client 115 in any manner that is desirable for a particular application.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A projector automation system comprising:
   one or more controlled systems having functionality that affects theatre environment and that is responsive at least in part to automation control signals;
   a digital projector having a control port;
   a film projector having a film cue sensor, wherein the film cue sensor generates cue signals;
   a first cinema automation component coupled to receive the cue signals and generate at least some of the automation control signals to the one or more controlled systems;
   a second cinema automation component having a first interface coupled to the control port of the digital projector and the first cinema automation system; and
   wherein the second cinema automation component includes means for generating at least some of the automation control signals to the one or more controlled systems.

2. The projector automation system of claim 1 further comprising sensors for sensing operational state of the first cinema automation component.

3. The projector automation system of claim 2 further comprising processes implemented in the second cinema automation component for responding to the sensed operational state by providing status information to an external control system.

4. The projector automation system of claim 2 wherein the sensors include one or more sensors selected from the group consisting of: a motor running sensor, a start switch sensor, a digital projector status sensor, a change over/close signal sensor, and an auditorium fire alarm sensor.

5. The projector automation system of claim 1 wherein the controlled system comprises an auditorium lighting system.

6. The projector automation system of claim 1 wherein the controlled system comprises an auditorium screen masking system.

7. The projector automation system of claim 1 wherein the controlled system comprises an auditorium audio subsystem.

8. The projector automation system of claim 1 wherein the second cinema automation component includes processing resources that implement scheduling processes containing schedules that are to be executed in a coordinated fashion by both the first cinema automation component and the second cinema automation component.

9. The projector automation system of claim 1 further comprising a theatre client computer implementing scheduling processes containing schedules that are to be executed in a coordinated fashion by both the first cinema automation component and the second cinema automation component.

10. The projector automation system of claim 9 wherein the second cinema automation system further comprises a client interface coupled to the theatre client computer, wherein the second cinema automation component receives schedule commands from the theatre client computer and responds with status information to the theatre client computer.

11. An automation device comprising:
a housing;
a processor provided in the housing capable of executing programmed instructions;
a first port to the housing configured to communicate with a cinema automation system;
a second port to the housing configured to communicate with a digital projector; and
a third pod to the housing configured to communicate with a central scheduling system;
wherein the automation device executes by operation of the processor stored scheduling commands and implements the stored scheduling commands by generating control signals on the first port and/or the second port with the processor; and
wherein the automation device operates the process to monitor status information on the first port and the second port and to provide the status information to the central scheduling system via the second or third port.

12. The automation device of claim 11 wherein the automation device receives commands from the central scheduling system and implements the received commands by generating control signals on the first port and/or the second port.

13. The automation device of claim 12 wherein the automation device monitors status information on the first port and the second port and provides the status information to the central scheduling system via the third port.

14. The automation device of claim 11 wherein the automation device is configured to operate in either a first mode or a second mode, wherein:

in the first mode the automation device receives commands from the central scheduling system and implements the received commands by generating control signals on the first port and/or the second port; and in the second mode the automation device executes stored scheduling commands and implements the stored scheduling commands by generating control signals on the first port and/or the second port.

15. A method for automating theatre activities comprising:
monitoring operational state of a film projector;
monitoring operational state of a digital projector; and
generating automation control signals to the film projector and the digital projector in response to the execution of scheduling commands;
wherein the acts of monitoring and generating automation control signals are performed by an automation device coupled to the film projector and the digital projector and the scheduling commands are provided by an external scheduling system coupled to the automation device.

16. The method of claim 15 wherein the scheduling commands are executed by the automation device.

17. The method of claim 15 further comprising:
generating automation control signals to external automatically controlled devices at least partially in response to the operational state of the film projector and/or the digital projector.

18. An automation device comprising:
a housing;
a processor in the housing capable of executing programmed instructions;
a first port to the housing configured to communicate with a cinema automation system;
a second port to the housing configured to communicate with a digital projector; and
a third port to the housing configured to communicate with a central scheduling system;
wherein the automation device receives commands from the central scheduling system and with the processor implements the received commands by generating control signals on the first port and/or the second port; and
wherein by operating the processor the automation device monitors status information on the first port and the second port and provides the status information to the central scheduling system via the third port.

19. The automation device of claim 18 wherein the automation device executes stored scheduling commands and implements the stored scheduling commands by generating control signals on the first port and/or the second port.

20. The automation device of claim 19 wherein the automation device monitors status information on the first port and the second port and provides the status information to the central scheduling system via the second or third port.

* * * * *